April 19, 1932.  J. W. SWENDSEN  1,855,073

ELECTRIC INDUCTION MOTOR

Filed Feb. 26, 1930  2 Sheets-Sheet 1

J. W. Swendsen
INVENTOR

By Marks & Clerk
Attys.

April 19, 1932.  J. W. SWENDSEN  1,855,073
ELECTRIC INDUCTION MOTOR
Filed Feb. 26, 1930    2 Sheets-Sheet 2
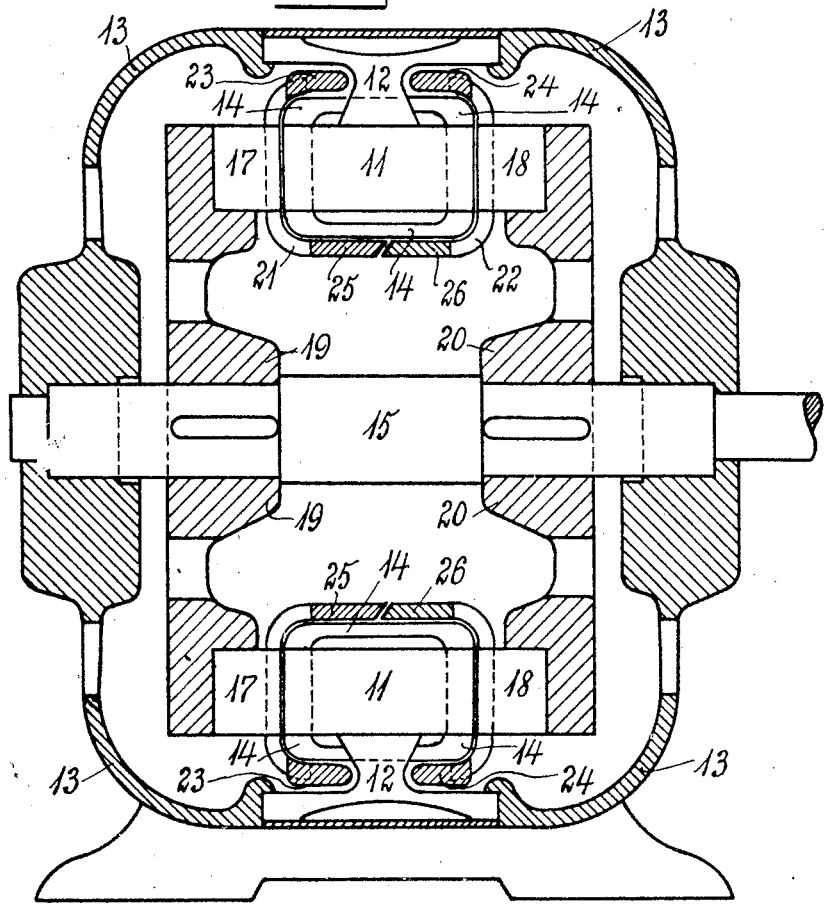
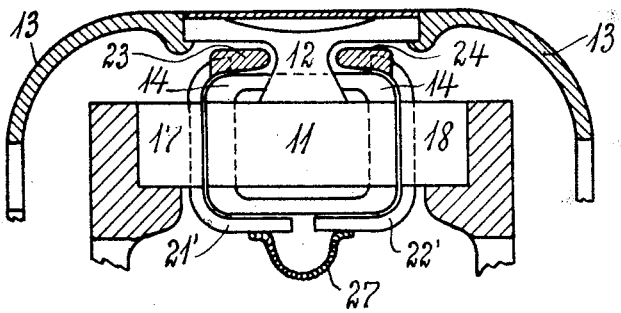
J. W. Swendsen
INVENTOR Patented Apr. 19, 1932

1,855,073

UNITED STATES PATENT OFFICE

JOHAN WALFRED SWENDSEN, OF OSLO, NORWAY

ELECTRIC INDUCTION MOTOR

Application filed February 26, 1930, Serial No. 431,534, and in Germany February 26, 1929.

The present invention relates generally to induction motors and especially to induction motors of the short-circuited type. The main object of this invention is to provide an induction motor, where the magnetic leakage loss is reduced to a minimum. According to this invention, this result is obtained by forming the short-circuited bars in substantially a U-shape in such a way that the bent-up portions of the bars will be influenced by the magnetic field at and around the ends of the coils in the primary winding.

To make this invention generally understood, it will in the following be described with reference to the drawings, illustrating preferred embodiments of the invention. In the drawings, Fig. 1 illustrates a longitudinal cross section of an induction motor according to this invention.

Fig. 4 illustrates the application of this invention to a short-circuiting motor of that type which employs strip-wound ring-shaped magnetic cores, and Fig. 5 illustrates a fraction, showing a modified construction of a motor as illustrated in Fig. 4.

Figure 1:
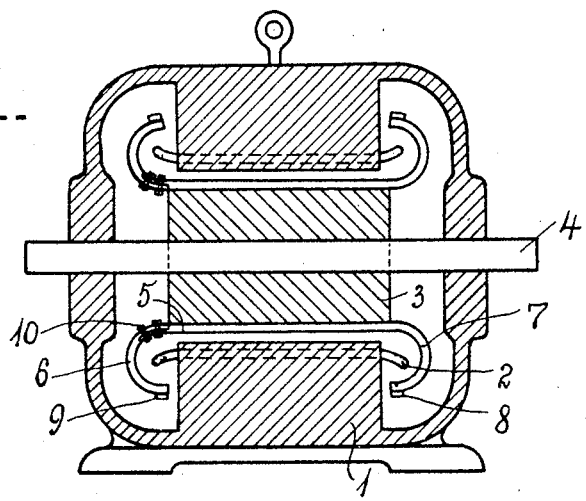
Figure 2:
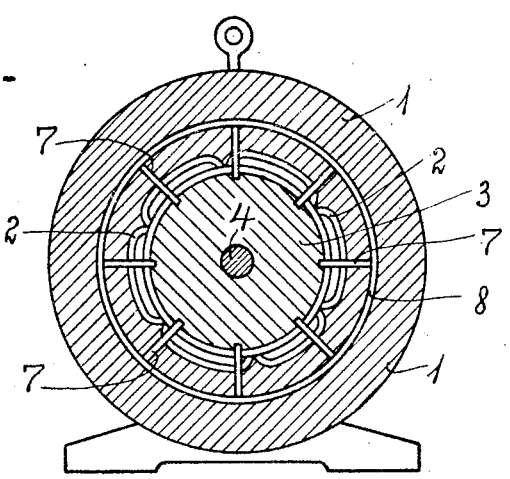
Fig. 2 is an end view, partly in section, of the motor shown in Fig. 1.
Figure 3:
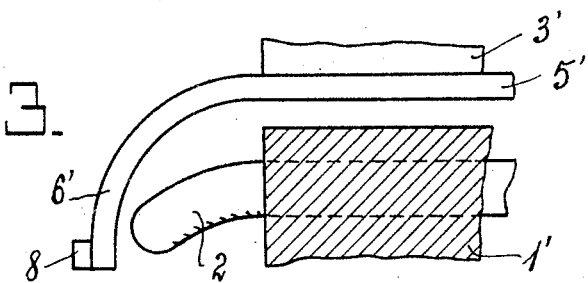
Fig. 3 is a fractional cross section on a larger scale, illustrating one end of the short circuiting bars, which are bent around the end of the primary winding.

In the drawings, Figs. 1-3, 1 represents the stator of the motor, which is equipped with conventional field coils 2. A short-circuited rotor 3 is in the conventional way arranged on an axle 4. The rotor 3 according to this invention is provided with short-circuited bars 5, the ends 6 and 7 of which are bent radially outwards in such a way that they encircle the free ends of the field coils 2. Short-circuiting rings 8 and 9 are arranged on the ends of the bent-up portions 6 and 7 of the bars 5.

In order to make the assembly and taking apart of the motor possible, the curved end sections 6 and 7 of the bars may be attached to these by means of bolts and nuts 10,—as shown in Fig. 1. Thus, when the rotor is to be taken out of the motor, the bolts 10 are removed, whereby the ring 9 with all the end sections 6 can be removed from the rotor and the latter be pulled out between the stator poles in conventional manner.

In Fig. 3 a modified embodiment of the above described motor is shown. In this embodiment, the short-circuiting bars 5' have a bent-up portion 6', which does not form a semi-circle as above described, but only a quarter of a circle. The upper half of the stator may thus be removed from the motor, before the rotor is removed.

In Fig. 4 the invention is shown applied to that type of motors, where strip-wound magnetic elements are used. The strip-wound elements are generally formed in the shape of rings, and a motor of this type generally has one rotor element on each side of a ring-wound stator element. In this type of motors, it is very important that the under and upper ends of the stator coils shall effectively take part in producing the torque.

In the embodiment shown in Fig. 4, the motor consists of a stator 11, which by means of suitable legs or the like 12 is fastened to the motor house 13. The stator is provided with a ring-wound primary coil 14. In the motor house, there is further arranged an axle 15, to which rotor elements 17 and 18 are attached by means of suitable hubs 19 and 20. The short-circuiting bars 21 and 22 of each of the rotor elements have generally U-shape and encircle practically each one half of the circumference of the stator, i. e. it will only be that little part left which is necessary for the legs 12 to pass in between the rings 23 and 24 on the outside of the stator. On the outside, the short-circuiting bars are equipped with rings 23 and 24 which substantially cover the outside of the stator coils, and on the inner side the bars may be equipped with rings 25, 26, which may be positioned adjacent to each other.

In Fig. 5 a fractional part of the motor of the above described type is shown, where, however, the rings 25, 26 on the inside of the stator 11 have been removed, and each of the bars 21', 22' is connected together by means of a flexible current-conducting ribbon 27.

In this way a motor is provided, where the short-circuiting bars practically surround the whole stator in an in-bent U-shape, and the flexible parts 27 of the secondary circuit will make the assembly and disassembly of the motor practical.

It will be understood that this invention is not limited to the above described details, as these have only been examples, whereby the invention may be readily understood by anybody skilled in the art.

Claims:

1. An induction motor comprising a stator having field coils, a rotor having short circuited bars carried thereby, said bars having short circuiting rings thereon encircling the ends of the field coils and being influenced by the magnetic flux produced by the ends of the coils.

2. A motor, comprising a stator having field coils extending from the ends thereof, a rotor having U-shaped short circuited bars thereon, the ends of the field coils being confined between the arms of the short circuited bars, both terminals of the short circuited bars having rings thereon encircling the ends of the field coils.

In testimony whereof I have signed my name unto this specification.

JOHAN WALFRED SWENDSEN.